United States Patent
Jia et al.

(10) Patent No.: US 6,463,248 B1
(45) Date of Patent: Oct. 8, 2002

(54) INTERMEDIATE TRANSFER BELT PROVIDING HIGH TRANSFER EFFICIENCY OF TONER IMAGES TO A TRANSFUSE MEMBER

(75) Inventors: Nancy Y. Jia, Webster, NY (US); Gerald M. Fletcher, Pittsford, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/728,754

(22) Filed: Dec. 4, 2000

(51) Int. Cl.7 ............................................. G03G 15/01
(52) U.S. Cl. ..................................... 399/302; 399/308
(58) Field of Search ................................. 399/157, 161, 399/162, 297, 298, 299, 301, 302, 307, 308, 325, 326; 430/33, 124; 428/195, 206, 207, 323

(56) References Cited

U.S. PATENT DOCUMENTS

| | | | |
|---|---|---|---|
| 4,341,455 A | 7/1982 | Fedder ......................... | 399/308 |
| 5,119,140 A | 6/1992 | Berkes et al. ................ | 399/390 |
| 5,452,063 A | 9/1995 | Fletcher ....................... | 399/308 |
| 5,565,975 A * | 10/1996 | Kumon et al. ............... | 399/302 |
| 5,612,773 A | 3/1997 | Berkes et al. ................ | 399/307 |
| 5,671,472 A | 9/1997 | Snelling ....................... | 399/308 |
| 5,802,442 A * | 9/1998 | Konno et al. ................ | 399/308 |
| 5,805,967 A | 9/1998 | DeBock et al. ........... | 399/299.1 |
| 5,873,018 A * | 2/1999 | Aoto et al. .................. | 399/302 |
| 5,890,045 A | 3/1999 | Till et al. .................... | 399/308 |
| 5,998,010 A * | 12/1999 | Schlueter, Jr. et al. ...... | 428/323 |
| 6,072,976 A * | 6/2000 | Kuriyama et al. .......... | 399/302 |
| 6,088,565 A | 7/2000 | Jia et al. ..................... | 399/302 |
| 6,141,524 A * | 10/2000 | Berkes et al. ............... | 399/307 |

\* cited by examiner

Primary Examiner—Hoan Tran
(74) Attorney, Agent, or Firm—E. O. Palazzo

(57) ABSTRACT

A color xerographic printing apparatus exhibiting a very high toner transfer efficiency. A rough-surfaced or bumpy Intermediate Transfer Belt (ITB) provides reduced contact area between toner particles and the ITB. Adhesion forces between the ITB and toner images deposited thereon are minimized thereby reducing the electrostatic forces required for transferring toner images from the ITB to a final imaging substrate or a transfuse belt. The bumpy configuration enables use of small quantities of release agent material such as silicone oil for further enhancing toner image transfer without transfer silicone oil to various components of the apparatus including an imaging member such as a photoreceptor.

4 Claims, 2 Drawing Sheets

INTERMEDIATE TRANSFER BELT PROVIDING HIGH TRANSFER EFFICIENCY OF TONER IMAGES TO A TRANSFUSE MEMBER

FIELD OF THE INVENTION

This invention relates to electrostatographic printing machines, and more particularly to an electrostatographic printing machine wherein toner images deposited on an intermediate belt are transferred with a high percentage of efficiency to a transfuse belt used for simultaneously transferring and fusing toner images to various substrate media such as plain paper.

BACKGROUND OF THE INVENTION

Electrostatographic printers are known in which a single color toner image is electrostatically formed on a charge retentive member such as a photoreceptor drum or belt. The toner image is directly transferred to a receiving substrate, typically paper or other suitable print receiving material. The toner image is subsequently fused or affixed to the substrate, usually by the simultaneous application of heat and pressure.

In other electrostatographic color printers, a plurality of toner imaging systems each including a charge retentive member are used to create multiple color toner images on a single image receiving member. The color toner images are electrostatically transferred from the charge retentive members to an intermediate transfer member to form a composite toner image on the intermediate transfer member. The intermediate transfer member could be an Intermediate Transfer Belt (ITB) or an intermediate transfer drum. The composite toner image is electrostatically transferred to the final substrate. Such systems that use electrostatic transfer to transfer the composite toner image from the intermediate belt to the final substrate and then subsequently fix the image on the substrate in a fusing system have transfer limitations. For example, there are limitations due to stresses introduced with rougher paper stock, foils, paper moisture content variations, etc. Also, the need to electrostatically transfer a fully layered color composite toner image to the substrate creates additional high stresses for electrostatic transfer. Stressful system conditions can include, for example, systems that use papers at wide ranges of relative humidity, and systems that create images on a large range of paper size and thickness. Such stresses can adversely affect transfer due to their effect on the electrostatic transfer fields, and they can also have significant effect on paper transport.

In addition with direct transfer to paper from an imaging module, is fibers, talc and other particulate debris or chemical contaminants can readily transfer from the paper to the imaging modules during direct contact in the electrostatic transfer zones. This tends to contaminate the imaging medium, development systems, cleaner systems, etc., and can lead to early failure of the such systems. This is especially true for certain stress inherent paper types including, for example, certain types of recycled papers. Due to all these and other problems, systems that use direct transfer to the final media generally have narrow media latitude for obtaining and/or for maintaining high print quality.

Alternatively, in another prior art printer, a toner image is formed on a photoreceptor. The toner image is transferred to a single intermediate transfer member usually referred to as a transfuse member. The transfuse member generally simultaneously transfers and fuses the toner image to a substrate. The use of a single transfer member in a transfuse system can result in high transfer efficiency of background toner on the photoreceptor to the substrate due to high adhesion between the toner and typical materials used for the transfuse member, such as silicone materials. In addition, oil oligomer is generally present or else added onto silicone or other materials used for transfuse members to assist toner release to paper under the high temperature conditions used for eventual transfer and fix of the image from the transfuse member to the final receiver substrate. The photoreceptor can be contaminated by heat and oil on the transfuse member via the transfer nip.

To overcome some of the deficiencies of these single transfer and double-transfer arrangements, prior systems have employed two transfer belts. Toner images are formed on photoreceptors and transferred to a first or intermediate transfer belt. The toner images are subsequently transferred to a second transfer member such as a transfuse belt.

Transfer of toner images has been addressed in many different ways as depicted in the patents noted below and incorporated herein by reference. In addition to possibly having some relevance to the question of patentability of the present invention, these references, together with the detailed description to follow, may provide a better understanding and appreciation of the present invention.

U.S. Pat. No. 6,088,565 granted to Jia et al on Jul. 11, 2000, discloses an electrostatographic printing machine that has multiple toner image producing stations, each forming a developed toner image of a component color. The developed toner images are electrostatically transferred at the first transfer nip to an intermediate transfer member to form a composite toner image thereon. Rheological assisted electrostatic transfer transfers the composite toner image at a second transfer nip to a transfuse member. The transfuse member preferably has improved conformability and other properties for improved transfusion of the composite toner image to a substrate. The transfuse member is maintained above the glass transition temperature of the composite toner image at the second transfer nip. The composite toner image and the substrate are brought together in a third transfer nip to simultaneously transfer the composite toner image and fuse the composite toner image to the substrate to form a final document.

U.S. Pat. No. 5,119,140 granted to Berkes et al on Jun. 2, 1992 discloses a method and apparatus wherein very efficient transfer of low toner masses from an intermediate image receiving member without degradation of high toner mass transfer is achieved using DC pretransfer corotron treatment of the toner on the intermediate followed by biased roll transfer to plain paper. U.S. Pat. No. 4,341,455 (Fedder), discloses an apparatus for transferring magnetic and conducting toner from a dielectric surface to plain paper by interposing a dielectric belt mechanism between the dielectric surface of an imaging drum and a plain paper substrate such that the toner is first transferred to the dielectric belt and subsequently transferred to a plain paper in a fusing station. The dielectric belt is preferably a material such as Teflon or polyethylene to which toner particles will not stick as they are fused in the heat-fuser station.

U.S. Pat. No. 5,612,773 granted to Berkes et al Mar. 18, 1997 discloses a transfusing member having a compression layer comprised of a highly conformable, low durometer material with a low surface free energy. The transfusing member forms a first transfer nip characterized by a first pressure with a photoreceptive surface and a second transfer nip characterized by a second pressure, which is of the same order of magnitude as the first pressure, with a backup roller.

U.S. Pat. No. 5,805,967 granted to DeBock et al on Sep. 8, 1998 discloses single-pass, multi-color electrostatographic printer has a transfer member that is driven along a continuous path. Toner images of different colors are simultaneously electrostatically deposited in powder form in registration with each other on the transfer member to form a multiple-layered toner image. The substrate is fed into contact with the transfer member for transfer of the multiple-layered toner image to at least one face of the substrate. The printer includes a heater for the multiple-layered toner image on the transfer member in advance of the transfer of the image to the substrate, and cooling capability for the transfer member following the transfer of the multiple toner image to the substrate, to a temperature below the glass transition temperature, $T_g$ of the toner, prior to deposition of further toner images on the transfer member. The second transfer member is cooled below the glass transition temperature of the toner prior to the transfer nip with the first transfer belt. Cooling of the second transfer belt requires the second transfer member to be relatively thin. A thin second transfer belt however has low conformance therefore providing reduced transfer efficiency when rougher paper or other media is in the transfuse nip. The reduced conformance also increases the potential for undesirable "differential gloss", which is high glossing when high toner mass per unit area types of color images are in the transfuse nip but relatively much lower glossing when low toner mass per area images are in the transfuse nip. In addition, a thin second transfer belt can have a reduced operational life.

U.S. Pat. No. 5,452,063 granted to Gerald M. Fletcher on Sep. 19, 1995 discloses an image forming apparatus using intermediate image transfer with high humidity papers wherein a toned image is formed on an image receiving member. The image forming apparatus includes an intermediate belt, at least one image forming device, and a transferring device. In one embodiment, the intermediate belt includes a conductive substrate and a topcoat insulating layer to receive the toned image so as to avoid lateral conduction of charges. In another embodiment, the image forming apparatus includes an intermediate belt having a semiconductive substrate and biasing means for biasing a transfer zone, pre-transfer zone and post-transfer area of the substrate.

U.S. Pat. No. 5.671,472 granted to Christopher Snelling on Sep. 23, 1997 discloses apparatus for forming toner images on an image receiving member and transferring the toner images from an image receiving member to copy sheets including a transfer intermediate member s having piezoelectric properties for transferring the images from the image receiving member to the transfer intermediate member and subsequently transferring the images from said transfer intermediate member to copy sheets.

U.S. Pat. No. 5,890,045 granted to Till et al on Mar. 30, 1999 discloses a method for transporting a developed image from a moving image bearing member to a moving copy substrate, comprising the steps of transferring the developed image from the moving image bearing member to a moving intermediate transfer member including an elastic belt at a first nip formed between the moving image bearing member and the moving intermediate member; transferring the developed image from the moving intermediate transfer member to the copy substrate at a second nip formed between the moving intermediate member and the moving copy substrate; transporting the moving image bearing member and the moving intermediate member at a substantiality equivalent first velocity in the first nip; and transporting the intermediate member and the moving copy substrate at a substantiality equivalent second velocity different from the first velocity in the second nip.

As can be appreciated from a consideration of the above-mentioned patents, problems inherent in toner image transfer from belt structures has not been accomplished, for the most part, without the use of devices associated with the belt for effecting such transfer and/or complicated belt configurations. In addition to the highly efficient transfer of toner images from an intermediate belt, it is also desirable to prevent any release agent material utilized in the printing process from being deposited on imaging members such as photoreceptor drums.

BRIEF SUMMARY OF THE INVENTION

Pursuant to the intents and purposes of the present invention, the Intermediate Transfer Belt (ITB) presented here has a surface that is fabricated to enable very high image transfer efficiency, i.e. a transfer efficiency nearly equal to 100%. Additionally, the ITB surface is effective in allowing only minimal deposition of release agent materials from the ITB onto photoreceptor surfaces.

To the foregoing ends, the surface of the belt is roughened such that the wavelength of the roughness is in the order of 20 nanometer to 3 $\mu$m and the peak to valley vertical distance is in the order of 20 nanometer to 5 $\mu$m.

The specified belt surface roughness minimizes the contact area between the toner particles and the ITB surface. The minimized contact area between toner particles and belt surface reduces the amount of electrostatic transfer field required. This enables high fidelity transfer from the ITB to paper and other image receiving media or from the ITB to a transfuse belt. While The ITB surface is roughened it is macroscopically smooth in order to avoid air-breakdown problems in the nip and pre-nip regions.

Another advantage of the roughened belt surface is that less oil is transferred from the print media or transfuse member to the ITB and less oil is transferred from the ITB to the photoreceptor. For example, with a single intermediate belt system that uses electrostatic transfer from the intermediate to the final print media and then fuses the toner in a fusing system, oil can be transferred to the print media in the fuser and carried back to the intermediate during transfer in a duplex mode. This can have adverse effects on transfer off of or onto the intermediate, and the oil can be carried to the imaging modules during subsequent contact between the intermediate and the imaging stations. For a single intermediate belt transfuse system, oil can be directly transferred to the imaging systems during contact of the ITB with the transfuse member. For a two belt transfuse system, oil from the transfuse member can transfer to the intermediate transfer member and subsequently transfer oil to the imaging systems from the first intermediate transfer member. The microscopically bumpy surface of the intermediate transfer member reduces the amount of oil transfer from the intermediate transfer member to the imaging systems. In addition, in a two belt transfuse system the microscopically bumpy surface of the intermediate transfer member reduces oil transfer from the transfuse member to the intermediate transfer member, and in a single intermediate belt system it reduces the amount of oil transfer from duplex print media to the intermediate transfer member.

Still another advantage is that friction forces on a blade cleaner are reduced resulting in longer belt and blade life.

Yet another advantage of a roughened or bumpy belt surface is the reduction of frictional forces on the transfer nips, thereby facilitating smooth separation of the intermediate from the imaging stations and allowing better stripping of print media from the intermediate, and also thereby reducing motion disturbances in the imaging system and reducing registration problems.

The bumpy aspects of the belt are effected by the addition of low surface energy, high Young's modulus particles to the material utilized for the fabrication of the belt. The particles are dispersed substantially uniformly through the belt thickness such that when particles occupying the top-most surface of a new belt are worn away particles that lie beneath those particles then occupy the top-most surface of the belt. Thus, the bumpy feature of the belt surface is continually renewed. Alternatively, the rigid particles are dispersed only on the topmost layer of the intermediate transfer member.

DETAILED DESCRIPTION OF THE DRAWINGS

DETAILED DESCRIPTION OF THE PREFERRED EMBODIMENT OF THE INVENTION

Figure 1:
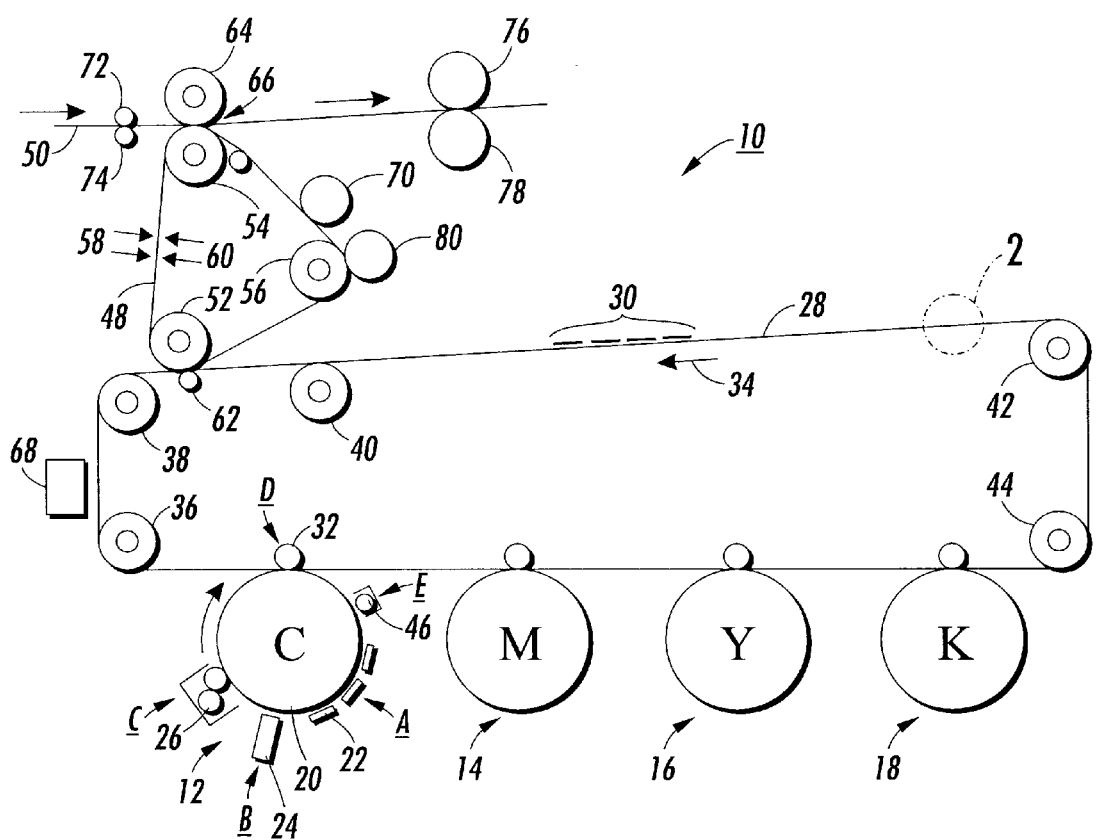
FIG. 1 is a schematic view of a print engine incorporating the present invention.

As illustrated in FIG. 1, a color printer 10 utilizes a plurality of xerographic imaging stations 12, 14, 16 and 18. Each station includes charge retentive surface such as a photoreceptor drum 20, preferably comprising an Active Matrix (AMAT) construction. Each drum is supported in a conventional manner for rotation in an endless path such that each portion thereof moves past or through a charging station A, exposure station B, development station C, image transfer station D and cleaning station E.

As portions of each drum move past a charging device such as an Aquatron or Di-scorotrons 22 or the like positioned at the charging station A they are provided with a uniform electrostatic charge. An Aquatron is a liquid charging device that is an ozone-free contact charging technique based on the electrification of a water contact to the photoreceptor surface. Its advantage over other contact charging techniques is that it provides excellent charging uniformity over a wide range of process speeds, e.g. to 50 ips, using a DC-only voltage. Furthermore, it is nearly 100% efficient, operating at near theoretical voltage and current levels.

After the drum is uniformly charged it is exposed to a laser based output scanning device 24 operatively supported adjacent the drum at the exposure station B. At exposure B the scanning device 24 illuminates a uniformly charged area of the drum with a light corresponding to a first separation color of an image being reproduced thereby selectively discharging the drum to form a first latent electrostatic image which is developed at the first imaging 12 station with cyan toner. Such development is effected using a suitable developer structure 26. In like manner Magenta, Yellow and black images are formed at the imaging stations 14, 16 and 18, respectively.

The cyan, magenta, yellow and black images are sequentially transferred to an Intermediate Transfer Belt (ITB) 28 to form composite color images 30 on the ITB, the cyan image being transferred thereto at the transfer station D. Image is transferred electrostatically using an electrically biased transfer roller 32. The ITB is supported for endless movement, in the direction of the arrow 34, about a plurality of rollers 36, 38, 40, 42 and 44. A conventional belt drive mechanism, not shown, is operatively connected to one of the rollers, say roller 36 for imparting motion to the ITB. Timing detectors (not shown) sense the movement of the intermediate belt 28 and communicate with machine logic circuits (not shown) to synchronize the various operations so that the proper sequence of events occurs in the printing process. Not every image created utilizes all four of the colors provided. Thus, controls, not shown, are provided for selective operation of the imaging stations.

Residual toner particles as well as debris are removed from the charge retentive drums at each imaging station using a suitable xerographic cleaning device such as an electrostatically biased roll structure 46. Other suitable cleaning structures comprise one or more cleaning blades, not shown.

The composite images 30 are transferred to a transfuse belt 48. A transfuse belt is one that simultaneously transfers and fuses toner images to a substrate such as sheet of plain paper 50. The transfuse belt is supported for movement in a clockwise endless path by a plurality of support rollers 52, 54 and 56. Transfuse belt movement is controlled using a drive mechanism, not shown, that may be operatively coupled to one of the support rollers 52, 54 or 56.

The temperature of the transfuse belt 48 is preferably elevated using suitable heating devices well know in the xerographic arts. The transfuse belt may be heated either externally and/or internally at various locations about the extent of the belt. By internally, is meant that the heat source is positioned within the loop made by the belt 48 while externally means that the heat source is positioned outside of the loop created by the belt. The source of heat may be radiant or contact or a combination of both. By way of example, an external heat source depicted schematically by arrows 58 may be positioned adjacent the transfuse belt as shown in order to heat the belt prior to image transfer from the transfuse belt to the substrate 50. An internal heat source depicted schematically by arrows 60 may also be utilized depending on the requirements of the apparatus in which the transfusing arrangement of the present invention is utilized. An internal heat source (not shown) can alternatively be mounted inside 52, 54, and/or 56. Transfer of toner images from the ITB 28 to the transfuse belt 48 may be electrostatically assisted using a biased transfer roller 62.

A backup roller 64 is provided for creating a nip 66 with the support roller 54 through which the transfuse belt 48 passes. A force is applied to the backup roller 64 in a well known manner to thereby create pressure in the nip 66 to enable transfer of toner images from the transfuse belt 48 to a substrate 50 as the substrate passes through the nip 66. The support roller 54 may be electrically biased for assisting in the transfer of toner images to the substrate 50.

Once the composite toner images are transferred from the ITB 28 to the transfuse belt 48, residual toner particles and debris are removed from the ITB using a well know cleaning member 68 not forming a part of the present invention. Preferably, the cleaning structure comprises a blade cleaner but may also comprise one or more electrically biased brushes. Likewise, once the toner images have been transferred to the substrate 50, residual toner particles and debris are removed from the transfuse belt 48 using one or more sticky rollers 70 contacting the surface of the belt 48 downstream of the nip 66. A sticky roller is a system that has a sticky surface at an elevated temperature to which toner particles and debris readily adhere upon contact with such material surface.

The substrate 50 may be heated prior to its passage through the nip 66. To this end, there is provided a pair of heat and pressure rollers 72 and 74, one or both of which may be heated for elevating the temperature of the substrate 50. The paper is preferably preheated by the rollers 72 and 74 to a temperature for example, of about 80° C. Preheating of the substrate 50 permits operation of the transfuse belt at a substantially lower transfusing temperature. For example, when the substrate 50 is preheated to a temperature of about 80° C. the transfuse belt which in the absence of preheating would be elevated to a temperature of about 140 to 160° C. would only have to be elevated to a temperature in the order of 100 to 120° C. Of course, these temperatures will increase or decrease depending on the softening and melting characteristics of the toner. By reducing the required operating temperature of the transfuse belt, the life of the belt is thereby substantially extended.

Toner image gloss enhancement may be provided using a pair of heat and pressure rollers 76 and 78 that are similar in construction to a conventional roll fuser. Variable as well as operator selected print gloss may be provided according to prior art techniques and therefore does not form a part of the present invention.

The transfuse belt 48 may be fabricated using any suitable material such as silicone rubber. The belt thickness is preferably about 1 mm and has a circumferential extent of, for example, 20 inches. As will be appreciated, a transfuse belt having such a relatively large circumference provides for high speed transfusing as well as a convenient size for accommodating the various devices for implementing the transfuse feature.

While a release agent material is not required for satisfactory operation of the transfuse belt a Release Agent Management (RAM) system for applying a release agent material such as silicone oil may be utilized for applying silicone oil to the transfuse belt surface. A RAM system utilized for this purpose comprises a donor roll 80. For sake of clarity, the other components of RAM system have been omitted. By the application of about 0.1 milligrams of silicone oil per sheet of paper, the transfuse belt life may be appreciably extended.

The ITB 28 is preferably fabricated from a polymer material such as polyimide, polycarbonate or the like. This belt may be fabricated in accordance with well known manufacturing processes such as extruding, is molding and casting. The belt thickness is for example about 80 microns. The belt may be either seamless of seamed but preferably comprises a seamless structure. The ITB can be a single layer or a multiple layer structure.

The ITB thermally isolates the imaging stations from the heat of the transfuse member. Therefore the transfuse member can operate at a relatively higher temperature without the potential to damage the imaging components such as photoreceptors. Because the transfuse member can be maintained at a higher temperature, the transfuse member can be relatively thick. Thick transfuse members are generally preferred over thin members for a number of reasons. For example release of melted toner and stripping of a copy sheet from a toner fixing surface can be significantly assisted by employing shear stresses in the fixing surface in the high pressure transfer nip that are generally referred to as "creep". The desired optimum creep for self stripping of a document and for good operating latitude for toner release generally requires a rubber over layer in the range of 0.5 mm to greater than 1 mm. A thick belt is also desired for creating a high degree of conformance to enable good transfer and fix in the transfer nip when rough papers are used. A thick transfuse belt thus generally has more media latitude than a thin transfuse belt. Thick transfuse members are also desired over thin members for achieving higher operational life. Finally, thick over layers are highly advantaged for transfuse systems that may wish to achieve low gloss in the transfer nip and employ an optional post transfuse gloss enhancing system to allow operators to optionally choose high or low gloss print output. The resistivity of the material used for the ITB should be such that high voltage drops across the intermediate transfer are avoided.

Figure 2:
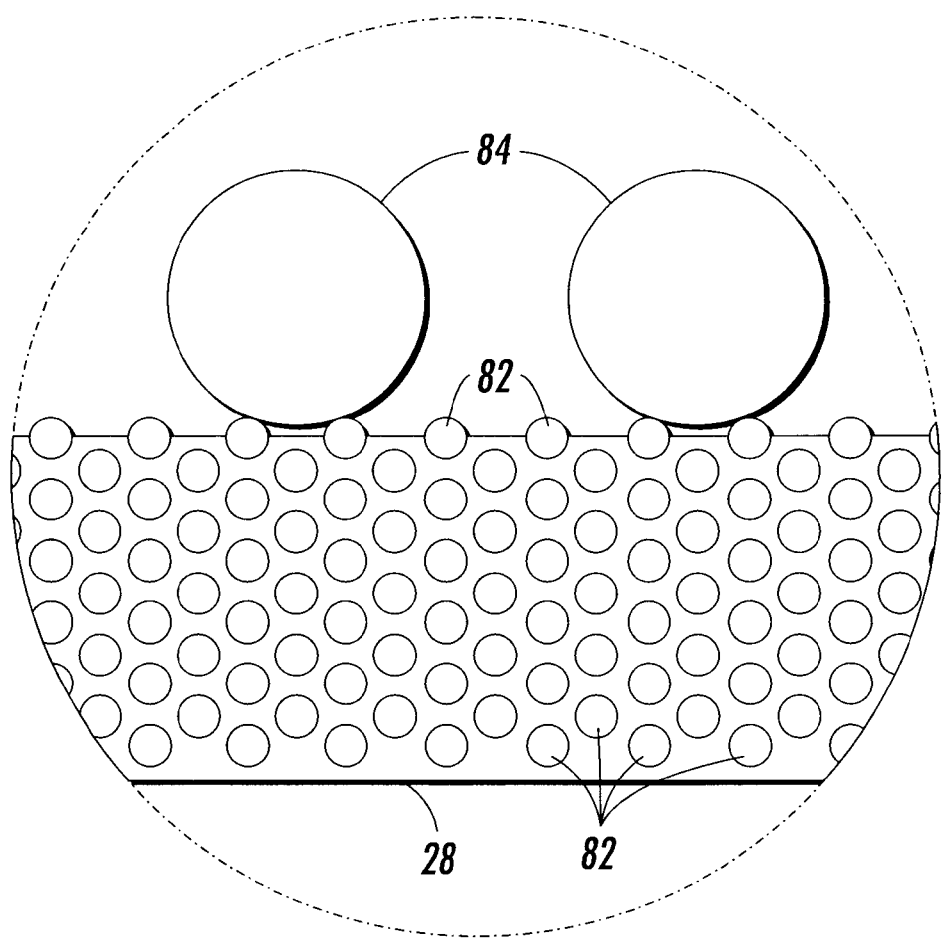
FIG. 2 is a fragmentary view of an Intermediate Transfer Belt (ITB) depicting an important aspect of the present invention.

Pursuant to the intents and purposes of the present invention, the ITB 28 has uniformly doped everywhere inside or only on a top coating layer (in a multiple layer ITB) with filler particles 82 (FIG. 2) The average diameter of the particles 82 is smaller than toner particles forming a part of a developer used in the imaging process. For a toner particle 84, about 7 microns in diameter and a filler diameter of about 40 nanometers to 5 $\mu$m the roughness provided by the filler has a wavelength in the range of 20 nanometers to 3 $\mu$m and has a peak to valley distance in the range of 20 nanometers to 5 $\mu$m. Such relative dimensions between the toner and filler particles result in relatively little contact area between the toner particles and the belt and thus less likelihood of toner adhesion to the belt. Reduced toner adhesion to the belt results in smaller electrostatic transfer fields being required. The size and therefore roughness of the ITB can be modified for various size toner particles, being made scaled down accordingly when smaller size toner particles are utilized. Some examples of filler material are silica, titanium oxide, tin oxide or other metal oxides so long as the filler particles are tougher and more durable against wear than the material used for the ITB such that wear of the filler is less than that of the rest of the ITB materials. In this case, wear source in the system can result in continuous refreshing the surface configuration of the belt. If necessary, the filler can be chemically treated to make it environmentally insensitive. The filler particles may be the conductivity control filler material presently used to control the electrical properties of an ITB.

The use of a release agent material as mentioned hereinbefore improves toner transfer from the ITB. It has been found that the above described belt structure restricts the transfer of release agent materials such as silicone being transferred from the ITB to other components of the system such as the photoreceptor drums and the transfuse belt.

What is claimed is:

1. A color printer comprising
    a plurality of xerographic imaging engines for creating cyan, magenta, yellow and black toner images;
    an intermediate transfer member having a bumpy surface supported for contact with each of said imaging engines for transfer of toner images thereto, said toner images being transferred to said intermediate transfer member in image registration for forming a composite color image on said intermediate transfer member, said bumpy surface including filler particles providing a roughness having a wavelength in the order of 20 nanometers to 3 $\mu$m and a peak to valley vertical distance in the range of 20 nanometers to 5 $\mu$m for maximizing image transfer from said intermediate transfer member to a transfuse member and minimizing release agent transfer from said transfuse member to said xerographic imaging engines via said intermediate transfer member;
    means supporting said intermediate transfer member for movement in an endless path;
    said transfuse member supported in contact with said intermediate transfer member and forming a first nip therewith;

means for supporting said transfuse member for movement in an endless path;

a pressure member supported in contact with said transfuse member and forming a second nip therewith;

a supply of print media and means for transporting said print media through said second nip for transfer of said composite color image thereto.

2. A color printer according to claim 1 wherein said intermediate transfer member comprises an elongated belt having said filler particles dispersed throughout the entire belt.

3. A color printer according to claim 2 wherein said filler particles are generally spherical in shape.

4. A color printer according to claim 2 wherein said intermediate transfer member comprises said elongated belt having said filler particles dispersed only in the topmost layer of said belt.

* * * * *